(12) United States Patent
Rømer et al.

(10) Patent No.: US 11,473,956 B2
(45) Date of Patent: Oct. 18, 2022

(54) INTEGRATED FLOW METER AND CONTROL VALVE

(71) Applicant: Kamstrup A/S, Skanderborg (DK)

(72) Inventors: Daniel Beck Rømer, Skanderborg (DK); Bjarke Fisker Brogaard, Skanderborg (DK)

(73) Assignee: Kamstrup A/S, Skanderborg (DK)

( * ) Notice: Subject to any disclaimer, the term of this patent is extended or adjusted under 35 U.S.C. 154(b) by 182 days.

(21) Appl. No.: 17/257,803

(22) PCT Filed: Jul. 4, 2019

(86) PCT No.: PCT/EP2019/068002
§ 371 (c)(1),
(2) Date: Jan. 4, 2021

(87) PCT Pub. No.: WO2020/007983
PCT Pub. Date: Jan. 9, 2020

(65) Prior Publication Data
US 2021/0278266 A1    Sep. 9, 2021

(30) Foreign Application Priority Data

Jul. 5, 2018 (EP) .................................. 18181937

(51) Int. Cl.
*G01F 15/00* (2006.01)
*F16K 27/06* (2006.01)
(Continued)

(52) U.S. Cl.
CPC .......... *G01F 15/005* (2013.01); *F16K 5/0642* (2013.01); *F16K 27/067* (2013.01);
(Continued)

(58) Field of Classification Search
CPC .......... G01F 15/005; G01F 15/14; G01F 1/66; G01F 1/662; G01F 1/667; F16K 5/0642; F16K 27/067; F16K 31/043; F16K 37/005
See application file for complete search history.

(56) References Cited

U.S. PATENT DOCUMENTS

| 4,236,406 A * | 12/1980 | Reed ........................ G01F 1/668 |
| | | 73/861.27 |
| 9,714,858 B2 * | 7/2017 | Laursen ................... G01F 15/06 |

(Continued)

FOREIGN PATENT DOCUMENTS

| AU | 200027855 A1 | 9/2000 |
| CN | 2360692 Y | 1/2000 |

(Continued)

OTHER PUBLICATIONS

European Search Report completed Jan. 3, 2019, for European Priority Application No. EP18181937.
(Continued)

*Primary Examiner* — David Colon-Morales
(74) *Attorney, Agent, or Firm* — Renner, Otto, Boisselle & Sklar, LLP

(57) ABSTRACT

Integrated flow meter and control valve (1) including a flow tube (11); a substantially watertight meter housing (12) providing a compartment (121), extending from the flow tube; a metering unit (139 arranged inside the compartment for measuring the flow of a medium flowing though the flow channel, and an electrical valve actuator (18) arranged inside the compartment and adapted to control a flow control element (19) arranged inside the flow channel, wherein that meter housing is formed as an integrated part of the flow tube with the compartment having a primary opening (124)
(Continued)

for insertion of the metering unit and a secondary sealable opening (125) for insertion of the electrical valve actuator.

15 Claims, 5 Drawing Sheets

(51) Int. Cl.
*F16K 31/04* (2006.01)
*F16K 37/00* (2006.01)
*G01F 15/14* (2006.01)
*F16K 5/06* (2006.01)

(52) U.S. Cl.
CPC .......... *F16K 31/043* (2013.01); *F16K 37/005* (2013.01); *G01F 15/14* (2013.01); *F16K 37/0041* (2013.01)

(56) References Cited

U.S. PATENT DOCUMENTS

| | | | | |
|---|---|---|---|---|
| 9,733,112 B2* | 8/2017 | Sørensen | ................ | G01P 5/245 |
| 9,928,724 B2* | 3/2018 | Alcorn | .................... | E03B 7/071 |
| 10,782,709 B2* | 9/2020 | Holoch | ..................... | G01F 1/00 |
| 11,047,115 B2* | 6/2021 | Brotherton | .............. | E03B 7/071 |
| 2015/0211905 A1* | 7/2015 | Drachmann | ............ | G01F 1/662 |
| | | | | 73/861.28 |
| 2015/0277447 A1* | 10/2015 | Schmidt | ................ | G01F 15/003 |
| | | | | 137/486 |
| 2017/0152648 A1* | 6/2017 | Hammond | .............. | G01F 1/662 |

FOREIGN PATENT DOCUMENTS

| | | | | |
|---|---|---|---|---|
| CN | 101910636 A | 12/2010 | | |
| CN | 201716062 U | 1/2011 | | |
| CN | 102840357 A | 12/2012 | | |
| CN | 107345581 A | 11/2017 | | |
| CN | 206847826 U * | 1/2018 | | |
| CN | 206847826 U | 1/2018 | | |
| CN | 108020273 A | 5/2018 | | |
| EP | 3321644 A1 * | 5/2018 | ............. | G01F 1/662 |
| EP | 3321644 A1 | 5/2018 | | |
| EP | 3715688 A1 * | 9/2020 | ........... | F16K 27/041 |
| GB | 9219882 | 11/1992 | | |
| GB | 2259775 A | 3/1993 | | |
| JP | 2001021404 A | 1/2001 | | |
| WO | WO-2017186248 A1 * | 11/2017 | ........... | F16K 27/041 |

OTHER PUBLICATIONS

International Search Report and Written Opinion dated Aug. 12, 2019, for International Patent Application No. PCT/EP2019/068002.

* cited by examiner

INTEGRATED FLOW METER AND CONTROL VALVE

This application is a national phase of International Application No. PCT/EP2019/068002 filed Jul. 4, 2019, and published in the English language, which claims priority to European Patent Application No. 18181937.6, filed Jul. 5, 2018.

FIELD OF THE INVENTION

The present invention relates to an integrated flow meter and control valve including a watertight meter housing providing a compartment for a metering unit and an electrical valve actuator.

BACKGROUND OF THE INVENTION

Utilities wishes to control the delivery of utilities, such as water and district heating or cooling, to the consumption sites connected to the utility distribution network. Consumption sites such as private residences, public buildings, private enterprises, farms etc. are connected to the utility distribution network. Meters, such as water utility meters or heat- or cooling meters, connects the consumption site to the utility distribution network and measures the volume of the utility delivered to the consumption site. Utility meters are becoming increasingly advanced electronic devices including remote communication, which enables the utility to remotely control the devices. Water utility meters includes communication interfaces such as proprietary advanced metering infrastructure (AMI) systems or public communication systems such as Narrow Band IOT devices introduced by the 5G cellular networks.

The utility meters may include or be associated with valve devices for managing the water, heating or cooling consumption, i.e. for disconnecting the consumption site from the utility distribution network or for providing a throttling function limiting the volume of water delivered to the consumption site.

Integrating a valve into a utility meter provides several advantages in terms of production, installation and operation. An integrated device is generally less expensive in terms of manufacturing, logistics and installation. Additionally, installation space is often limited rendering installation of separate meters and valves difficult. Further, as the operation of the meter and valve may be interdependent it is advantageously combine the two in the same functional unit with shared processing and communication devices.

However, integrating a mechanical valve in an advanced electronic utility meter is not straight forward. As water and district heart and cooling utility meters are often battery supplied, power consumption is a limiting factor. Further, water permeability of the construction must be control to ensure long-time stability of the meter.

Hence, an improved utility meter with an integrated valve would be advantageous, and in particular a compact integrated utility meter and valve suitable for automated production would be advantageous.

OBJECT OF THE INVENTION

It is an object of the present invention to wholly or partly overcome the above disadvantages and drawbacks of the prior art. More specifically, it is an object to provide a compact integrated utility meter and valve suitable for automated production.

SUMMARY OF THE INVENTION

Thus, the above described object and several other objects are intended to be obtained in a first aspect of the invention by providing an integrated flow meter and control valve including: a flow tube providing a flow channel extending between an inlet- and an outlet opening; a substantially watertight meter housing providing a compartment, extending from the flow tube; a metering unit arranged inside the compartment for measuring the flow of a medium flowing though the flow channel, and an electrical valve actuator arranged inside the compartment and adapted to control a flow control element arranged inside the flow channel; a control module including a wireless communication device arranged inside the compartment; and a self-contained power supply arranged inside the compartment; characterized in that meter housing is formed as an integrated part of the flow tube with the compartment having a primary opening for insertion of the metering unit and a secondary sealable opening for insertion of the electrical valve actuator.

An integrated meter housing with two openings provides the basis for a compact utility meter suitable for automated production comprising an integrated valve. A housing providing one compartment with two openings allows for a reduction in the total volume of the housing and for communication between different units arranged in the compartment.

Further, the housing and flow tube may be formed as an monolithic component by injection molding or another cast process. The housing and flow tube may be made from polymer or a polymer composition or composite, such as a fiber-reinforced polymer composite.

In one embodiment, the primary opening and the secondary opening of the meter housing may face in opposite direction. Also, the housing may provide a primary compartment housing the metering unit, the primary compartment being accessible through the primary opening; and a secondary compartment housing the electrical valve actuator, the secondary compartment being accessible through the secondary opening.

Furthermore, the primary- and secondary compartments may be interconnected by a housing passage. The housing passage may be used for providing a power- and communication connection between the metering unit and the valve actuator.

The first and second sealable openings and the meter housing geometry may allow for linear insertion of the metering unit and the electrical valve actuator into the compartment. Linear insertion allows for automated production wherein manufacturing equipment may be configured to insert the units into the meter housing.

Additionally, the primary- and secondary sealable openings may be arranged on opposite sides of the flow tube. Doing may reduce the overall length of the water meter as the opening does not have to be arranged side by side. Alternatively, the openings may be placed at an angle relatively to one another, e.g. 90 degrees apart.

Furthermore, the electrical valve actuator may be electrically connected to the metering unit by an electrical connecting element. The metering unit and the electrical valve actuator may also be powered by the common self-contained power supply.

In one embodiment, the electrical valve actuator may include a valve stem connected with the flow control element, the valve stem being arranged in a stem bore extending from the secondary compartment into the flow channel to engage. The valve stem may be kept in place by the valve actuator being secured to the meter housing. Also, the stem bore and the valve stem may be tapered towards the flow channel.

In addition, a drain space may be provided along the stem bore between first and second barrier gaskets, and the drain space may be connected to a drain channel in fluid communication with a drain outlet provided in an exterior wall of the flow meter housing. Connecting the drain channel to atmospheric pressure provides pressure equalization of the drain space. This pressure equalization fluidly decouples the flow channel form the inside of the meter housing effectively preventing fluid from the flow channel from entering the inside of the compartment.

Furthermore, the electrical valve actuator may include an electric motor connected to a valve stem via a gear train including multiple stages of reduction. The gear train may provide a gear ratio between 8000:1 and 12000:1, preferably a gear ration of approximately 11000:1.

Moreover, the inlet- or outlet opening may be configured for insertion of the flow control element into the flow tube. Also, a fixation element may be arranged in the inlet- or outlet opening to fixate the flow control element inside the flow tube and the fixation element may be fixed to the flow tube by ultrasonic welding.

The above features of the present invention may each be combined with any of the other features. These and other features of the invention will be apparent from and elucidated with reference to the embodiments described hereinafter.

BRIEF DESCRIPTION OF THE FIGURES

The integrated flow meter and control valve according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1A:
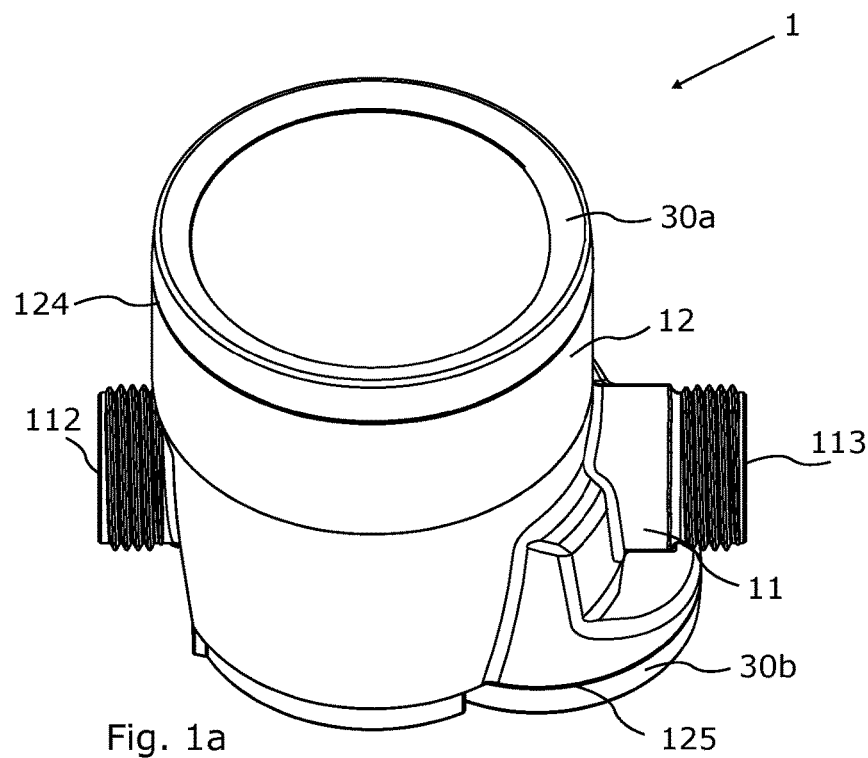
FIG. 1a shows a perspective view of an integrated flow meter and control valve according to one embodiment.
Figure 1B:
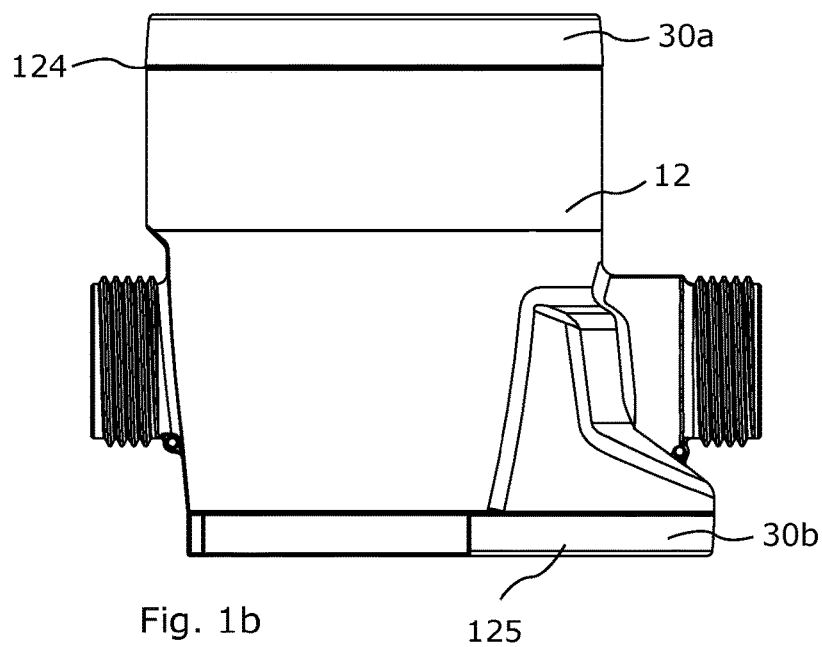
FIG. 1b shows a side view of the integrated flow meter and control valve of FIG. 1.
Figure 1C:
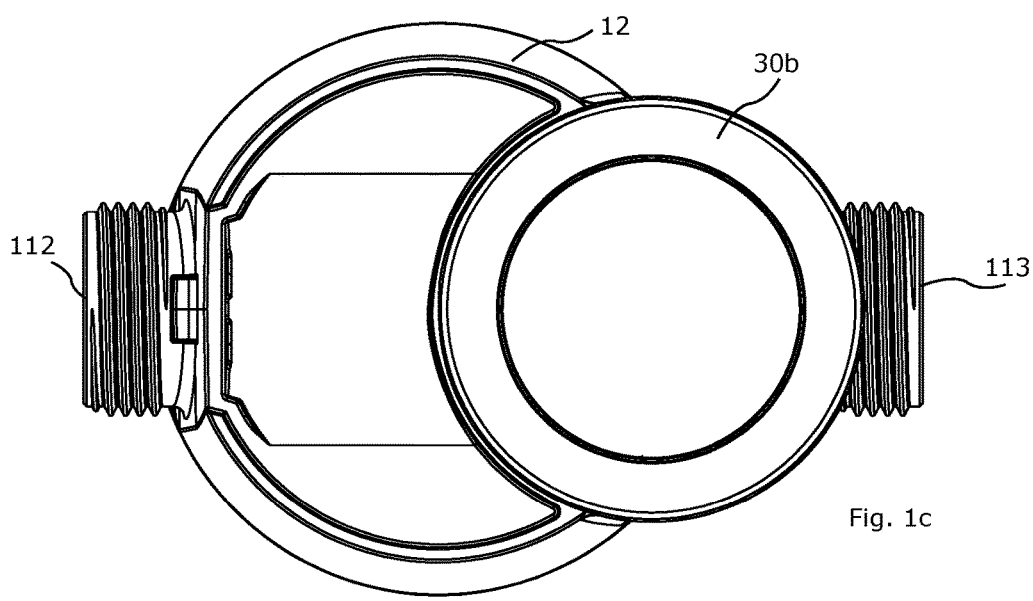
FIG. 1c shows a bottom view of the integrated flow meter and control valve of FIG. 1.

FIG. 1a-1c illustrates an integrated flow meter 1 provided with a control valve according to one embodiment of the invention. The flow meter comprises a flow tube 11 with a flow channel 111 for passage a the fluid between an inlet 112 and an outlet 113. A meter housing 12 is formed as an integrated part of the flow tube 11 thereby providing a compartment 121 for meter components. The compartment may be one common compartment or divided into two or more separate comparts. The compartment is provided with a primary opening 124 and a secondary opening 125, each closed-off by a lid 30a, 30b arranged to provide a water-tight seal against the rime of the respective opening.

Figure 2:
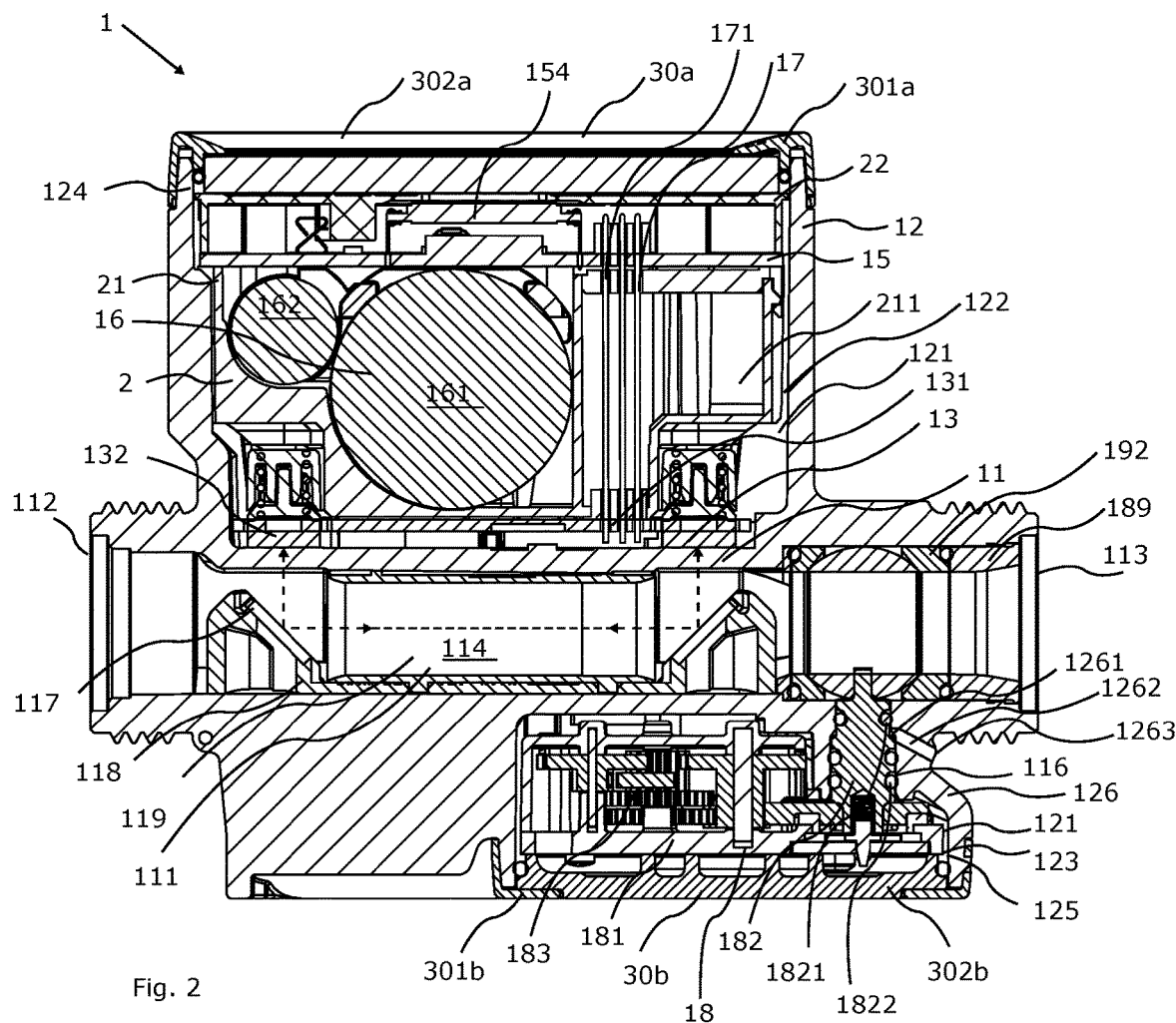
FIG. 2 shows a longitudinal cross section of an integrated flow meter and control valve.

Referring to FIG. 2, the lid 30a for the primary opening is constituted by a locking ring 301a and a transparent cover element 302a. Between the lid and the rim of the primary opening a sealing element is arranged to provide a water-tight seal. The lid 30b for the secondary opening includes a cover element 302b provided with locking means 301b configured for engagement with the rim of the secondary opening. Between the cover element 302b and the rim of the secondary opening, another sealing element is arranged to provide a water-tight seal.

Still referring to FIG. 2, the primary opening 124 provides access to a primary compartment 122, which may be a part of the common compartment of a separate compartments if the housing includes multiple compartments. A metering unit 13 including a measurement printed circuit board (measurement PCB) 131 is mounted in a bottom part of the primary compartment. The measurement PCB includes a measurement circuit communicating with two ultrasonic transducers 132 arranged in the primary compartment to transmit and receive ultrasonic signals through the flow tube. In the shown embodiment, the ultrasonic transducers are mounted on a lower side of the measurement PCB with a lower side of the ultrasonic transducers, opposite the PCB, being arranged against an outer surface of the flow tube 11. The meter circuit is configured for operating the ultrasonic transducers to transmit and receive ultrasonic wave packets through the flow tube and a fluid present in the flow channel.

Ultrasonic wave packets are generated by the transducers are transmitted through the wall of the flow tube 11 illustrated by the double-arrows in FIG. 2. Inside the flow channel 111, the wave packets are reflected by reflectors 117 being part of an reflector unit 118 also including a measuring tube 119. Hereby, the wave packets are directed from one transducer constituting a transmitter to the other transducer operated as a receiver transducer for the respective wave packet. Subsequently, the transducers switch functionality so that the transducer once operated as a transmitter now functions as a receiver and vice versa. In the shown embodiment the ultrasonic wave packet thus follow a U-shaped signal path from one transducer to the other. In other embodiments, alternative reflector configurations resulting in alternative signal paths may be applied. The section of the flow channel wherein the flow of a fluid is measured, in the shown embodiments the section containing the reflector unit, is also denoted the measuring section 114 of the flow channel.

The measurement PCB further includes a processor for controlling the measurement process and possible subsequent flow data processing, a non-volatile memory for storing calibration- and flow related data, and a connector providing an interface for powering and communicating with the circuits of the measurement PCB. On top of the measurement PCB above the ultrasonic transducers, transducer backing devices are arranged to provide a holding force to the area of the PCB containing the ultrasonic transducers, thereby pressing the lower side of the transducers against the flow tube. The backing devices are connected with the flow tube to provide sufficient holding force to keep the transducers in place for the duration of the lifetime of the meter. The backing devices may for example be connected to the flow tube by mounting screw extending through the measurement PCB. In addition to providing the holding force to the transducers, mounting of the backing devices fixates the measurement PCB in the bottom of the primary compartment of the meter housing.

The secondary opening 125 provides access to a secondary compartment 123, which may be a part of the common compartment of a separate compartments if the housing includes multiple compartments. The secondary compartment houses an electrical valve actuator 18 adapted to control a flow control element 19 arranged inside the flow channel. In the shown embodiment the flow control element is a valve ball. The electrical valve actuator 18 includes a rotatable valve stem 182 connected to the flow control. The valve stem is arranged in a valve stem bore 116 provided in a part of the flow tube 11 facing the secondary compartment. The valve stem thus extends from the secondary compartment into the flow channel to engage with the flow control element.

In the embodiment shown in FIG. 2, the valve stem 182 has a tapered shape and the stem bore has a corresponding tapered geometry tapering towards the flow channel. The tapered shape of the valve stem reduces the surface area of the valve stem exposed to the internal pressure of the flow channel during operation of the flow meter. A first barrier gasket 1821 is arranged around the valve stem adjacent to the exit of the valve stem bore into the flow channel. Further down the valve stem towards the secondary compartment, one or more second barrier gaskets 1822 are provided. Along the stem bore a drain space 1261 is provided between the first and second barrier gaskets. The drain space is connected to a drain channel 1262 in fluid communication with a drain outlet 1263 provided in an exterior wall 126 of the flow meter housing.

Figure 4:
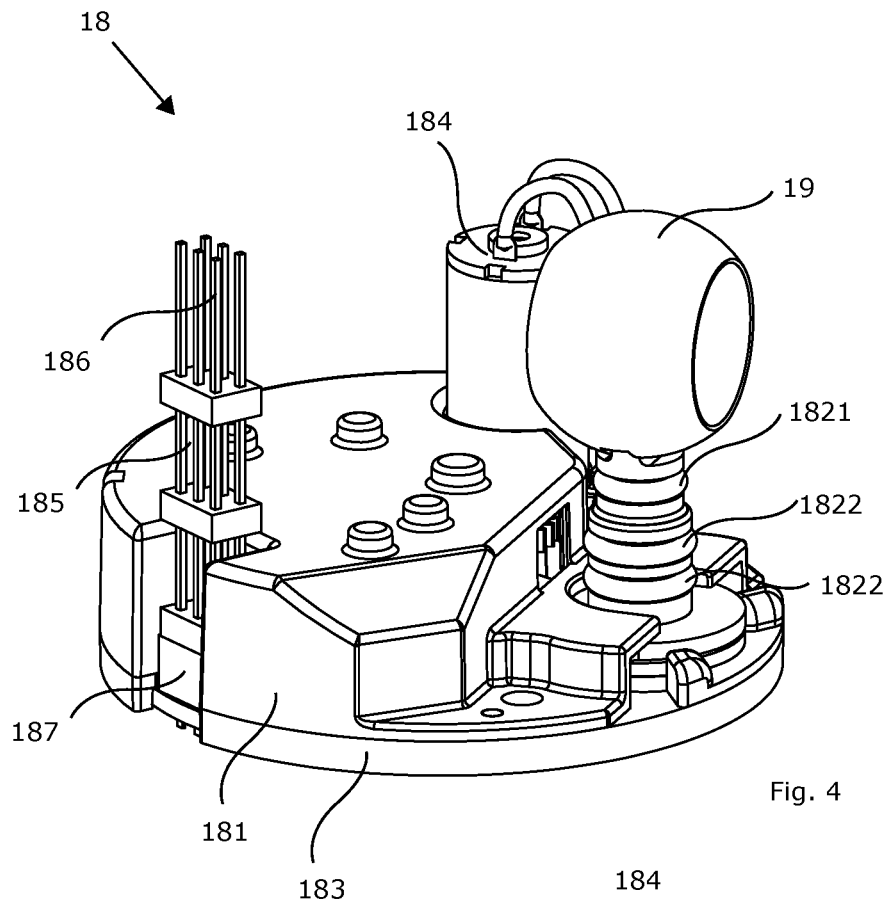
FIG. 4 shows a valve actuator provided with a flow control element and an electrical connecting element.
Figure 5:
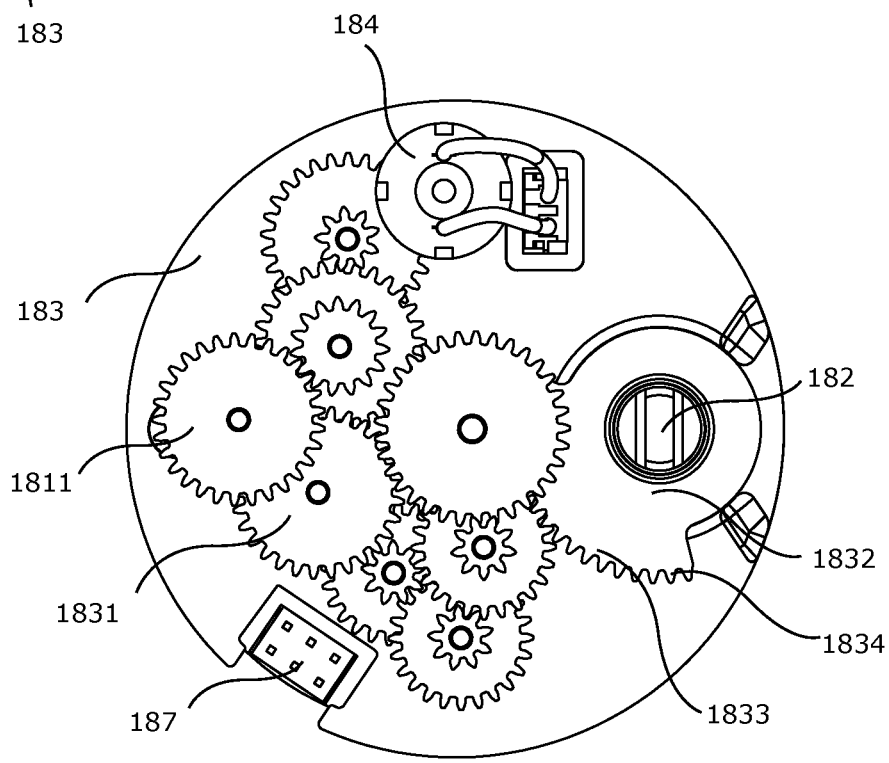
FIG. 5 shows a gear train of the valve actuator.

Referring to FIG. 4, the electrical valve actuator 18 includes a gear housing 181 wherein a gear train 1811 is arranged and an electric motor 184 mounted on the gear housing. As shown in FIG. 5, the gear train connects the electrical motor and the valve stem 182 whereby the flow control element in the flow channel may be rotated by the electrical motor. The gear train includes multiple compound gears 1831 providing multiple stages of reduction and a gear ratio between 8000:1 and 12000:1, preferably a gear ration of approximately 11000:1. The output of the gear train is transferred to a gear element 1832 mounted on the valve stem. The gear element includes a number of gear teeth 1834 arranged as a circular section thereby constituting a gear segment 1833. In the shown embodiment, the gear segment spans 120° degrees. In alternative embodiments the gear segment may span between 90° degrees and 240° degrees. By providing the gear element with a limited gear segment and not at regular gear spanning 360° degrees, the space taken up by the gear is reduced. At the same time the valve stem can only be rotated back and forth in a limited angular interval. The valve stem thus cannot be rotated continuously in one direction of rotation or through a complete rotation. The angle of rotation provided by the gear segment is sufficient to rotate the flow control element between an open position allowing flow through the flow channel and a closed position blocking flow through the flow channel. Additional, the valve may be rotated a bit further beyond the closed position and the open position. The additional rotation may be used to prevent sedimentation or remove deposits on the flow control element or other valve parts.

Figure 6A:
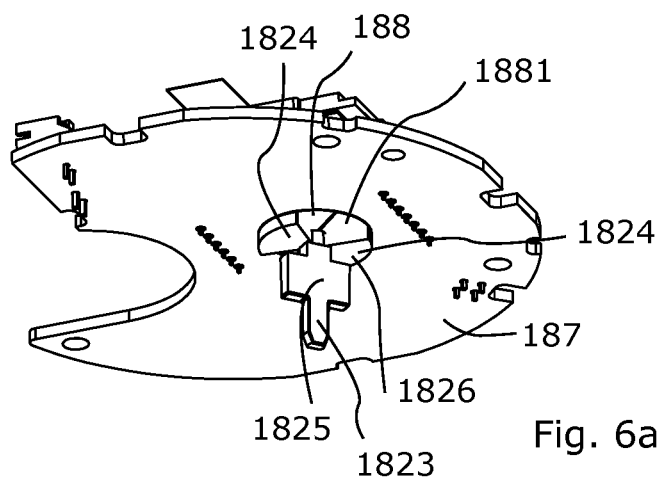
FIGS. 6a and 6b show a position sensor for the control valve.
Figure 6B:
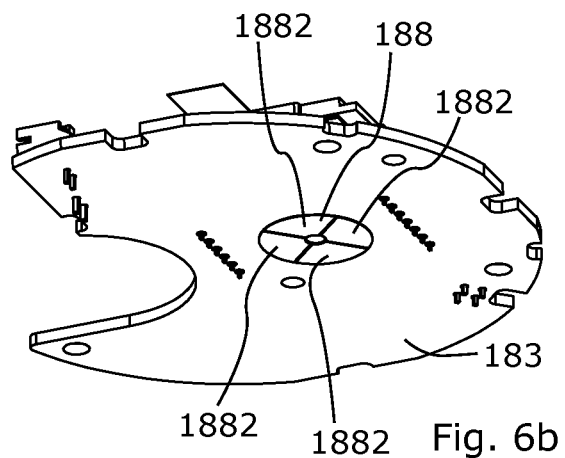

The valve actuator further includes a valve printed circuit board (valve PCB) 183 mounted on the gear housing. The valve PCB includes circuitry for controlling and powering the electric motor and circuitry 188 for controlling the rotational position of the valve stem and flow control element 19. Referring to FIGS. 6a and 6b, the circuitry includes a sensing disc 1881 provided on a side of the valve PCB 183 facing towards the valve stem. The sensing disc comprises a number of separate conductive regions 1882 covered by an isolating/dielectric coating. More specifically, the sensing disc is comprised by four regions each constituting a 90 degree circle wedge. Additionally, a rotation member 1823 is arranged in a recess in the valve stem 182. The rotation member is at least partially made form a conducive material and includes a central shaft 1825 provided with two oppositely arranged circle wedges 1824. The circle wedges are conductive and electrically connected thereby constituting a sensor plate 1826.

By arranging the sensor plate 1826 of the rotation member opposite the conductive regions of the sensing disc, a capacitor construction is realized. Each of the conductive regions are connected to an integrated circuit of the processor on the measurement PCB via a power- and communication connection 185, described in more detail below. And by applying a potential to one of the conductive regions and grounding the others, an electrical circuit may be created.

As the sensor plate rotates with the valve stem above the conductive regions, variable capacitances are created between the separate circle wedges of the sensor plate and the separate conductive regions. As the capacitance of a capacitor depends on the area of the overlap between the conductive region and the sensor plate, the capacitance of each of the variable capacitors reaches a maximum when a circle wedge is positioned directly above a conductive region. As the sensor plate always overlaps at least two conductive regions a circuit including two serial coupled capacitors is created. A first capacitor is created between a first conductive region coupled to a potential and the sensor plate and a second capacitor is created between the sensor plate and one or more of the other conductive regions.

The integrated circuit connected to the conductive regions is capable of giving a measure of the capacitance of each conductive region in a given instance of time. By tracking and processing this measure of capacitance for each conductive region, it is possible to determine the equivalent absolute position of the rotation member, as the capacitance of the regions changes in a well-defined manner. In the shown embodiment, the sensing disc is comprised by four regions each constituting a 90 degree circle wedge. However, in other embodiments fewer or more regions could be applied to reduce or increase resolution of the encoder.

As the rotation member is rotationally fixed to the valve stem, which again is coupled to the flow control element, it is possible to determine the rotational position of the flow control element from the position of the rotation member. Based on the rotational position of the flow control element, the position of the valve can be determined.

Figure 3A:
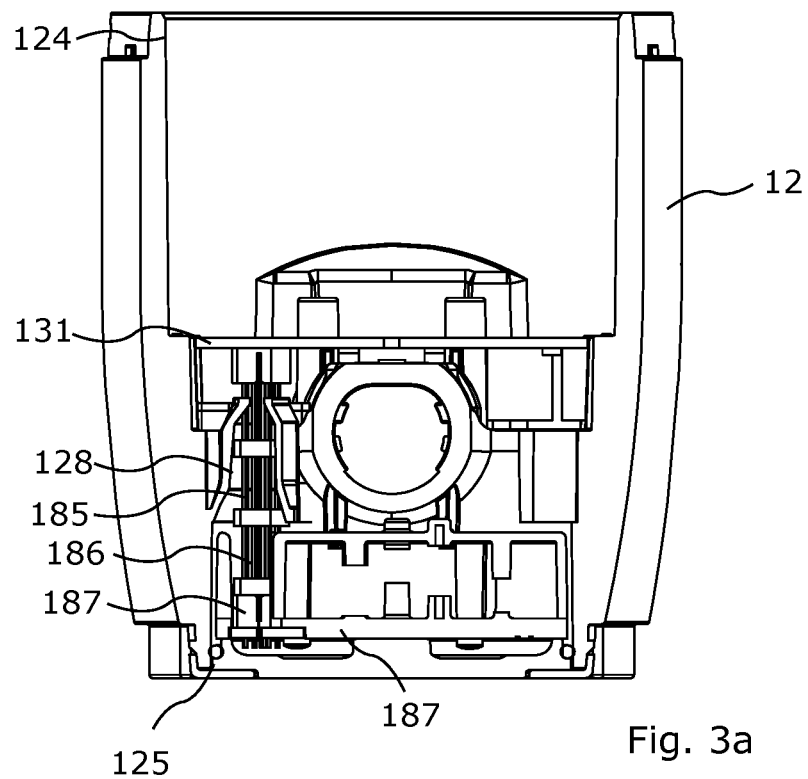
FIG. 3a shows a transversal cross section of an integrated flow meter and control valve.

As illustrated by FIG. 3a, a power- and communication connection 185 is provided between the measurement PCB 131 and the valve PCB 183. As shown in the figures, the circuity of the valve PCB is electrically connected to the measurement PCB via an electrical connecting element 186 interconnecting a connector on the measurement PCB and a connector 187 on the valve PCB. Alternative electrical connections, such as a wire or a connecting printed circuit board, may also be envisaged and is considered implicitly and unambiguously derivable from the present disclosure. The connecting element extends through a housing passage 128 provided in the meter housing between the primary- and secondary compartments. The connecting element may be the shown six pol pin header or another type of connector adapted for providing a power- and communication connection.

As seen from FIG. 2, the flow control element 19 is positioned proximate to the outlet of the flow tube. The flow control element is supported by a valve seat 192 and an O-ring or other packing elements on opposite sides. The O-ring is provided to control the compression force between the ball seat and the valve ball. By including an O-ring, tolerance requirements on the flow tube constituting a valve housing may be reduced, while achieving the required compression force on the flow control element. Including O-rings also provides resilience into the construction, which may prevent or reduce problems related to stuck valve balls caused by wear, corrosion and/or sedimentation. The flow control element, valve seats and O-rings are kept in place inside the flow tube by a fixation element 189. The fixation element may be fixed in the flow tube by ultrasonic welding, alternatively by a threaded connection to the flow tube or by alternative means known to the skilled person. Positioning the flow control element at the outlet of the flow tube, downstream from a measurement section of the flow channel wherein fluid flow is measured, prevents the position of the flow control element from potentially affecting measurement accuracy. In an alternative embodiment the flow control element and the valve actuator may alternatively be arranged upstream from the measurement section.

Figure 3B:
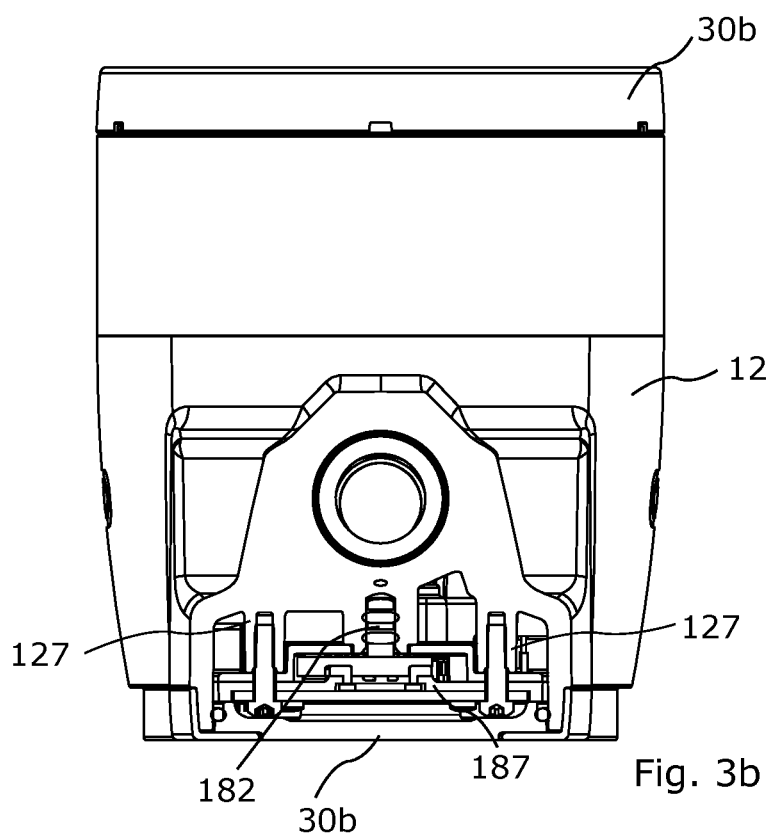
FIG. 3b shows another transversal cross section of an integrated flow meter and control valve.

Still referring to FIG. 2, the flow control element 19, valve seats and O-rings are inserted into the flow tube through its outlet. The valve stem is inserted into the stem bore through the secondary opening to engage with a recess in the flow control element. Inserting the valve stem from the outside into the flow channel, requires a holding force to be applied to the valve stem due the internal pressure of the flow channel during operation of the flow meter. As previously mentioned, the valve stem has a tapered shape to reduce the surface area of the valve stem exposed to the channel pressure, and thus reduce the required holding force. The holding force is achieved by securing the gear housing to the meter housing, e.g. using screws mounted in struts or posts 127 integrally formed with the meter housing as shown in FIG. 3*b*.

The primary- and secondary openings compartments extend from opposite sides of the flow tube, with the primary- and secondary openings 124, 125 arranged facing in opposite direction. The directions of the openings are thus parallel and 180 degrees apart. Hereby linear insertion of the measurement PCB and the valve actuator may be effected from opposite directions and from opposite sides of the meter housing, alternatively from the same side by rotating the meter housing 180 degrees.

Referring again to FIG. 2, the flow meter further includes a control module 2 arranged on top of the measurement PCB inside the primary compartment. The control module is an independent module including a module housing 21 containing a self-contained power supply 16 including a battery pack. A battery pack should be construed as an assembly of one or more battery cells 161, such as commonly known A, C or D-cells, optionally in combination with a hybrid layer capacitor 162 (HLC) (manufactured and sold by Tadiran Batteries™) or another type of capacitor. The battery pack may be wrapped or packed to appear as a common unit and provided with an electrical connector, such as a wire and plug-connector or battery mounted pins for engagement with plated through holes of a PCB. The module housing 21 further includes a compartment 211 for storing a desiccant. On top of the module housing a main printed circuit board (main PCB) 15 is mounted. The main PCB includes a central processing unit for controlling operation of the flow meter, a memory circuit for storing meter related data, and a wireless communication device providing a communication interface for wireless communicating with external units. The wireless communication interface may be compatible to any known communication standards such as NFC, RFID, NB-IoT, cellular technologies, radio communication, etc.

Between the main PCB and the measurement PCB a power- and communication connection 17 is provided. In the shown figures, the communication connection is constituted by an electrical connecting element 171 interconnecting a connector on the main PCB and a connector on the measurement PCB. The connecting element may be the shown six pol pin header or another type of connector adapted for providing a power- and communication connection between the main printed circuit board and the measurement printed circuit board. In addition to the power- and communication connection, the connecting element 171 also provides a tamper connection between the main PCB and the measurement PCB used for detecting potential tampering attempts. The tamper connection between the PCBs is used to detect whether the main PCB has been separated from the measurement PCB.

The main PCB is electrically connected to the battery pack and via the connecting element 171 the battery pack may supplies both the measurement PCB and the valve actuator. The main PCB thus serves as a hub for controlling and powering the flow meter including the valve actuator.

As shown in FIG. 4*b*, the main PCB further includes a display element 154 configured for displaying flow or fluid related data, a socket connector and a set of diodes configured for infra-red communications. The control module also includes a front plate element 22 mounted onto top of the main PCB as seen from FIG. 4*a*. An antenna element (not shown) is mounted along a circumferential edge of the front plate element. The antenna element is connected with the wireless communication device of the main PCB via contact surfaces provided on the main PCB and provides an RF antenna for transmitting and/or receiving radio communication.

As previously described, the valve actuator in communicatively coupled to the processor on the measurement PCB and the central processing unit on the main PCB controls. These processors may thus be used to control the valve actuator. The valve actuator may be controlled move the flow control element between an open position allowing flow through the flow tube, a closed position blocking flow or intermediate positions restricting flow, thereby providing a throttling function. Commands for controlling the valve may be received from external units via the communication interface provided by the wireless communication device. Alternatively, the central processing unit and/or the processor of the measurement PCB may be programmed to control the valve actuator autonomously, e.g. based on measurements performed by the metering unit. As an example, the central processing unit may receive a command from an external device to allow a certain amount of water to flow through the meter. Having received the command the central processing unit forwards a command to the processor in the metering unit specifying that the metering unit shall control the valve actuator to move the flow control element into an open position and allow passage of the specified amount of water. Having opened the flow control element, the metering unit measures the amount of water flowing through the meter and when the specified amount is reached, the valve actuator is controlled to move the flow control element to the closed position.

The invention can be implemented by means of hardware, software, firmware or any combination of these. The invention or some of the features thereof can also be implemented as software running on one or more data processors and/or digital signal processors.

Elements of one embodiment may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. An integrated flow meter and control valve comprising:
   a flow tube providing a flow channel extending between an inlet and an outlet opening;
   a substantially watertight meter housing providing a compartment, extending from the flow tube;
   a metering unit arranged inside the compartment for measuring the flow of a medium flowing though the flow channel,
   an electrical valve actuator arranged inside the compartment and adapted to control a flow control element arranged inside the flow channel;
   a control module including a wireless communication device arranged inside the compartment; and
   a self-contained power supply arranged inside the compartment;
   wherein the meter housing is formed as an integrated part of the flow tube with the compartment having a primary opening for insertion of the metering unit and a secondary sealable opening for insertion of the electrical valve actuator.

2. An integrated flow meter and control valve according to claim 1, wherein the control module is communicatively coupled to the metering unit and the valve actuator and the control module is configured to transmit commands to the meter unit and/or the valve actuator to control the position of the flow control element.

3. An integrated flow meter and control valve according to claim 1, wherein the primary opening and the secondary opening face in opposite directions.

4. An integrated flow meter and control valve according to claim 1, wherein the meter housing provides a primary compartment housing the metering unit, the primary compartment being accessible through the primary opening; and a secondary compartment housing the electrical valve actuator, the secondary compartment being accessible through the secondary opening.

5. An integrated flow meter and control valve according to claim 1, wherein the primary and secondary sealable openings are arranged on opposite sides of the flow tube.

6. An integrated flow meter and control valve according to claim 1, wherein the electrical valve actuator is electrically connected to the metering unit by an electrical connecting element.

7. An integrated flow meter and control valve according to claim 1, wherein the metering unit and the electrical valve actuator are powered by the common self-contained power supply.

8. An integrated flow meter and control valve according to claim 1, wherein the electrical valve actuator includes a valve stem connected with the flow control element, the valve stem being arranged in a stem bore extending from the secondary compartment into the flow channel to engage.

9. An integrated flow meter and control valve according to claim 8, wherein the valve stem is kept in place by the valve actuator being secured to the meter housing.

10. An integrated flow meter and control valve according to claim 8, wherein the stem bore and the valve stem are tapered towards the flow channel.

11. An integrated flow meter and control valve according to claim 8, wherein a drain space is provided along the stem bore between first and second barrier gaskets, the drain space being connected to a drain channel in fluid communication with a drain outlet provided in an exterior wall of the flow meter housing.

12. An integrated flow meter and control valve according to claim 1, wherein the electrical valve actuator includes an electric motor connected to a valve stem via a gear train.

13. An integrated flow meter and control valve according to claim 12, wherein the gear train including a plurality of compound gears providing multiple stages of reduction.

14. An integrated flow meter and control valve according to claim 1, wherein the inlet- or outlet opening is configured for insertion of the flow control element into the flow tube and wherein a fixation element is arranged in the inlet- or outlet opening to fixate the flow control element inside the flow tube.

15. An integrated flow meter and control valve according to claim 1, wherein the flow control element is arranged downstream from a measurement section of the flow channel wherein fluid flow is measured.

* * * * *